(12) United States Patent
Rajagopal et al.

(10) Patent No.: US 8,493,983 B2
(45) Date of Patent: Jul. 23, 2013

(54) VIRTUAL FABRIC MEMBERSHIP ASSIGNMENTS FOR FIBER CHANNEL OVER ETHERNET NETWORK DEVICES

(75) Inventors: Ganesan Rajagopal, Bangalore (IN); Sunil John Varghese, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 12/791,982

(22) Filed: Jun. 2, 2010

(65) Prior Publication Data

US 2011/0299539 A1  Dec. 8, 2011

(51) Int. Cl.
*H04L 12/28* (2006.01)
*H04L 12/56* (2006.01)

(52) U.S. Cl.
USPC .................................................... 370/395.53

(58) Field of Classification Search
USPC ...................................... 370/395.53; 707/205
See application file for complete search history.

(56) References Cited

U.S. PATENT DOCUMENTS

| | | | | |
|---|---|---|---|---|
| 6,567,403 | B1 * | 5/2003 | Congdon et al. | 370/389 |
| 7,082,138 | B2 * | 7/2006 | Yik et al. | 370/410 |
| 7,426,212 | B2 * | 9/2008 | Someya et al. | 370/401 |
| 7,484,021 | B2 | 1/2009 | Rastogi et al. | |
| 7,710,898 | B2 * | 5/2010 | Graves | 370/254 |
| 7,970,873 | B2 * | 6/2011 | Nguyen et al. | 709/221 |
| 8,358,661 | B2 * | 1/2013 | Armstrong et al. | 370/401 |
| 2006/0092932 | A1 | 5/2006 | Ghosh et al. | |
| 2009/0252181 | A1 * | 10/2009 | Desanti | 370/474 |
| 2011/0044344 | A1 * | 2/2011 | Hudson et al. | 370/395.53 |
| 2011/0176412 | A1 * | 7/2011 | Stine et al. | 370/221 |
| 2011/0268127 | A1 * | 11/2011 | Dhar et al. | 370/401 |
| 2012/0254440 | A1 * | 10/2012 | Wang | 709/226 |

OTHER PUBLICATIONS

Cisco Systems, "Fibre Channel over Ethernet Initialization Protocol," White Paper, Sep. 2009, pp. 1-12.

* cited by examiner

*Primary Examiner* — Mark Rinehart
*Assistant Examiner* — Kenneth P Hunt
(74) *Attorney, Agent, or Firm* — Edell, Shapiro & Finnan, LLC (57) ABSTRACT

Techniques are provided herein for receiving at a first network device, a virtual local area network (VLAN) discovery frame from a second network device. The second network device is configured to encapsulate Fiber Channel over Ethernet. The hardware media access control (MAC) address or Port World Wide Name (PWWN) of the second network device is extracted from the VLAN discovery frame. A mapping is identified between the second network device and a corresponding virtual storage area network (VSAN) based on the hardware MAC address or PWWN. The mapping identifies a corresponding VLAN for the second network device to use for login in order to communicate with the corresponding VSAN. Information representing the identified VLAN is sent to the second network device.

20 Claims, 6 Drawing Sheets

VIRTUAL FABRIC MEMBERSHIP ASSIGNMENTS FOR FIBER CHANNEL OVER ETHERNET NETWORK DEVICES

BACKGROUND

Storage Area Networks (SANs) reliably store large amounts of data for an organization. Clusters of storage devices in one location are called SAN islands and communicate among themselves using the Fiber Channel (FC) protocol. Users accessing a SAN typically reside on an Ethernet based Local Area Network (LAN) at another location. Recent advances have led to the creation of Virtual SANs (VSANs) and Virtual LANs (VLANs). VSANs and VLANs remove the physical boundaries of networks and allow a more functional approach, e.g., an engineering department VLAN can be associated with an engineering department VSAN, or an accounting department VLAN can be associated with an accounting department VSAN, regardless of the location of network devices in the VLAN or storage devices in the VSAN. To facilitate communications between the Ethernet based LANs and FC based SANs, and to maintain the reliability associated with the FC protocol, Fiber Channel over Ethernet (FCoE) was developed. FCoE encapsulates FC frames using the Ethernet protocol.

To mediate the conversion from FCoE to FC between the two networks, and vice versa, an intermediate switch is employed, and is sometimes referred to as an FC Forwarder (FCF). When a network device or node accesses an FCF it must login to an FCoE capable VLAN. To learn the correct VLAN to login to, the network device sends a VLAN discovery frame to the FCF. The FCF responds with a list of FCoE enabled VLANs. The network node can now login to the appropriate VLAN and communicate with the desired VSAN.

DESCRIPTION OF EXAMPLE EMBODIMENTS

Overview

Techniques are provided herein for receiving at a first network device, a VLAN discovery frame from a second network device. The second network device is configured to encapsulate Fiber Channel over Ethernet. The hardware media access control (MAC) address or Port World Wide Name (PWWN) of the second network device is extracted from the VLAN discovery frame. A mapping is identified between the second network device and a corresponding VSAN based on the hardware MAC address or PWWN. The mapping identifies a corresponding VLAN for the second network device to use for login in order to communicate with the corresponding VSAN. Information representing the identified VLAN is sent to the second network device.

Example Embodiments

Figure 1:
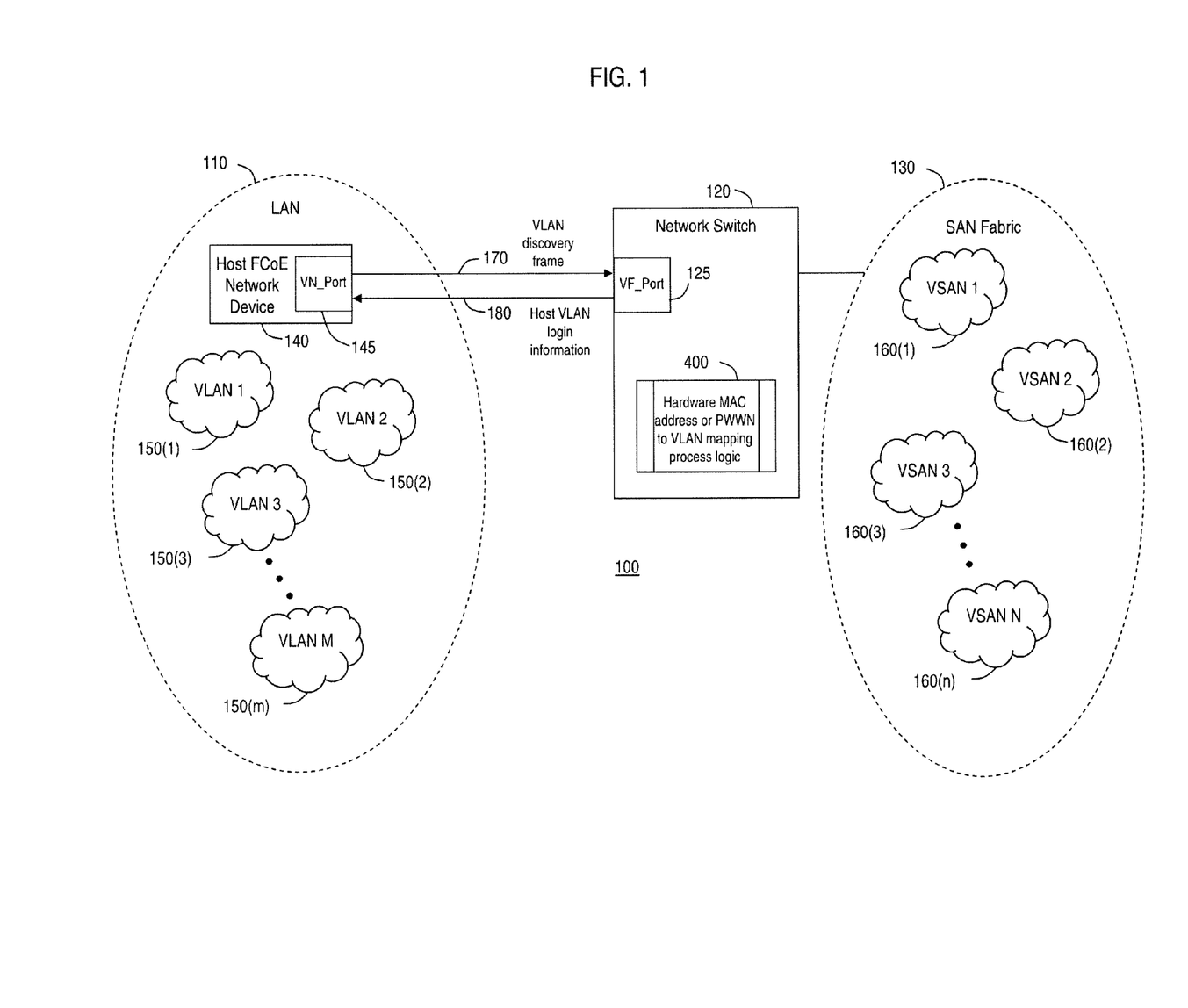
FIG. 1 is an example block diagram of a network in which a network device is configured to determine a VLAN to VSAN mapping using a hardware Media Access Control (MAC) protocol address.

Referring first to FIG. 1, an example network 100 is shown. The network 100 has a LAN 110, a network switch 120, and SAN fabric 130. Within LAN 110 is a Host FCoE network device 140. Host 140 is configured to login to a native or default VLAN, and to login to one or more VLANs 1-M identified by reference numerals 150(1)-150(m) that may be configured in LAN 110. Within SAN fabric 130 are a plurality of VSANs 1-N identified by reference numerals 160(1)-160 (n). One or more VLANs in LAN 110 may be mapped to a VSAN in SAN fabric 130 via the network switch 120. The network switch 120 forwards FC frames to the SAN fabric 140 and operates as an FCF as described above.

In FCoE, a network node, e.g., Host FCoE network device 140, or an ENode in FC parlance, encapsulates FC frames and sends them out through an Ethernet connection or port. The Ethernet port at the network node is connected to an Ethernet port on an FCF. At the FC layer, the port on the network node is called an N_Port, while the port on the switch is called an F_Port and is associated with the N_Port. The ports are extensible and allow multiple virtual FC connections to be formed over the same physical Ethernet pipe using virtual ports (VF_Ports and VN_Ports). In this example, VF_Port 125 is associated with network switch 120 and VN_Port 145 is associated with host 140. The VN_Port 145 on the host 140 is mapped to a corresponding VF_Port 125 on the switch 120.

At the switch 120, virtual fiber channel (VFC) interfaces are created and comprise an object that represents the VF_Port. One VFC interface is needed for each physical Ethernet connection on the switch 120 that will carry FCoE traffic. More than one network node can connect through the same VFC interface to a desired VSAN with each network node having its own VF_Port, i.e., multiple VF_Ports may be mapped to the VFC interface. Each VFC interface is also mapped to a specific VSAN. At login, the VF_Port is mapped to the VFC interface associated with the desired VSAN. To summarize, a connection is created at login from a VN_Port to VF_Port, VF_Port to VFC interface, and a VFC interface to desired VSAN. All of the initial communications, from sending the VLAN discovery frame to FCF login acceptance, takes place using the FCoE Initialization Protocol (FIP), and the FCoE protocol is used thereafter to exchange data.

When host 140 desires access to its assigned VSAN, e.g., VSAN 3, the host discovers the appropriate corresponding VLAN from VLANs 1-M in order to access VSAN 3. Host 140 is already connected to the network via the native VLAN, and at 170, sends a VLAN discovery frame to switch 120. Switch 120 is configured with hardware MAC address or PWWN to VLAN mapping process logic 400. The process logic 400 will be described generally in connection with FIGS. 1-3, and described in greater detail in connection with FIGS. 4 and 5. The process logic 400 generally determines an appropriate VLAN, e.g., VLAN 2, for host 140 to login to based on the hardware MAC address or PWWN of the host, e.g., host 140. By virtue of the process logic 400, the switch does not need to maintain a VFC interface for each possible host because the process logic 400 can look up the mapping at the time the VLAN discovery frame is received, and as described hereinafter, the VLAN used for VLAN discovery will typically be different from the VLAN actually used for host login. At 180, the switch 120 sends information representing the corresponding VLAN to host 140 over the default VLAN. In one example, switch 120 sends "VLAN 2" to host 140. Host 140 can then login to VLAN 2 to communicate with VSAN 3. It is also possible that the appropriate or corresponding VLAN is the native or default VLAN.

After VLAN discovery and before host login, the host also "discovers" an FCF that is connected to the desired VLAN, i.e., the FCF used for VLAN discovery may not be the FCF that host logs into. The FCF discovery process may be coincidental with host login. For ease of illustration herein, it is assumed that VLAN discovery, host login, and other FCF functions are performed using a single FCF.

Figure 2:
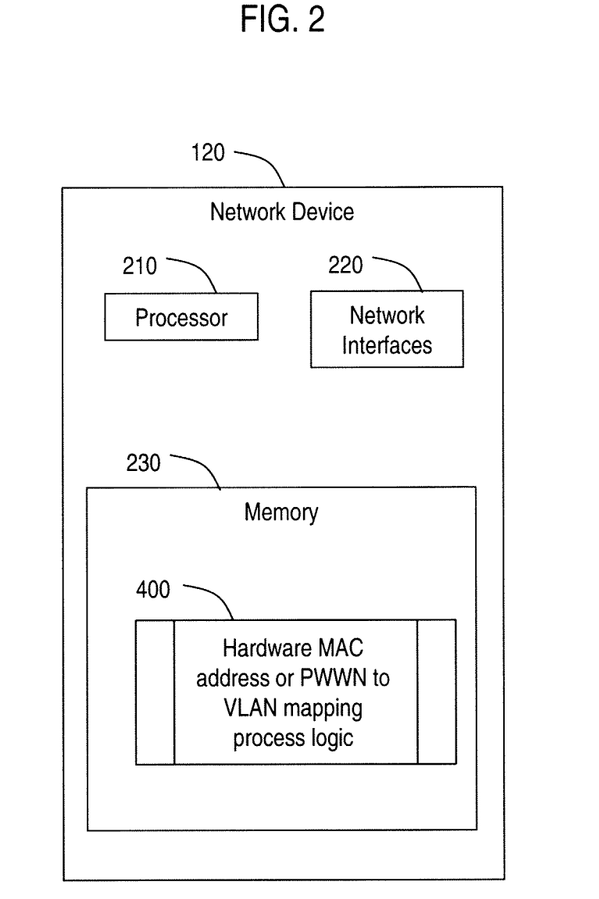
FIG. 2 is an example block diagram of a network device that is configured to determine a VLAN to VSAN mapping using a hardware MAC address.

Referring to FIG. 2, an example block diagram of a network device, e.g., switch 120, is shown. The switch 120 comprises a data processing device 210, a plurality of network interfaces 220, and a memory 230. Resident in the memory 230 is software configured to hardware MAC address or PWWN to VLAN mapping process logic 400. It should be noted that the hardware MAC address is the MAC address assigned to the device at manufacture that has a 24-bit organizationally unique identifier assigned by the Institute of Electrical and Electronics Engineers (IEEE). The hardware MAC address referred to herein is not the FCF assigned MAC address or fabric-provided MAC address (FPMA) that is assigned at login and comprises a 24-bit FCoE MAC address prefix (FC-MAP) and a 24-bit FC identification (FCID).

The data processing device 210 may be a microprocessor, a microcontroller, systems on a chip (SOCs), or other fixed or programmable logic. The memory 210 may be any form of random access memory (RAM) or other data storage block that stores data used for the techniques described herein. The memory 210 may be separate or part of the processor 210. Instructions for performing the process logic 400 may be stored or encoded in the memory 210 for execution by the processor 210 such that when executed by the processor, causes the processor to perform the functions describe herein in connection with FIGS. 4, 5a and 5b. The network interfaces 220 enable communication over network 100. For example, network interfaces that face the LAN 110 may be Ethernet interfaces, while interfaces that face SAN fabric 130 may be FC host bus adapters (HBAs), or multi-protocol interfaces, e.g., HBAs that are Ethernet and FC capable. It should be understood that any of the devices in system 100 may be configured with a similar hardware or software configuration as switch 120.

The functions of the processor 210 may be implemented by a tangible computer readable medium (e.g., memory 210) encoded with instructions or by logic encoded in one or more tangible media (e.g., embedded logic such as an application specific integrated circuit (ASIC), digital signal processor (DSP) instructions, software that is executed by a processor, etc.), wherein the memory 230 stores data used for the computations or functions described herein (and/or to store software or processor instructions that are executed to carry out the computations or functions described herein). Thus, functions of the process logic 400 may be implemented with fixed logic or programmable logic (e.g., software or computer instructions executed by a processor or field programmable gate array (FPGA)).

Figure 3:
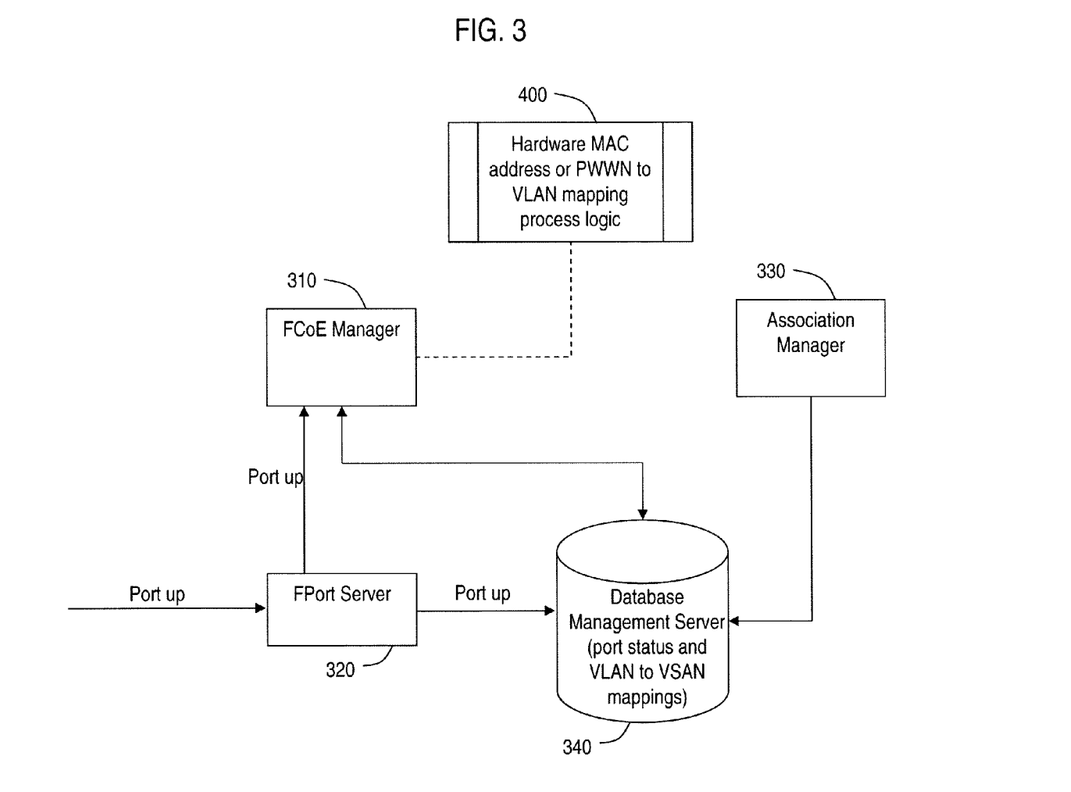
FIG. 3 is an example block diagram showing logical components of a network device that is configured to determine a VLAN to VSAN mapping using a hardware MAC address.

Turning now to FIG. 3, an example block diagram is shown that depicts logical components of a network device, e.g., switch 120, that is configured to determine a VLAN to VSAN mapping by way of the hardware MAC address or PWWN to VLAN mapping process logic 400. The logical components depict functionality and may or may not be tied to a particular piece of hardware or memory. For example, these components may be implemented in software on a single processor, e.g., processor 210 shown in FIG. 2, or may be embodied as separate hardware components. FIG. 3 also shows the interconnection of these components with the hardware MAC address or PWWN to VLAN mapping process logic 400.

The components include an FCoE manager 310, an Fport server 320, an association manager 330, and database management server (DMS) 340 that manages a database. The database may comprise several components, or one or more separate and independent databases. For example, one component may contain hardware MAC address or PWWN to VSAN mappings that may be queried or managed by a dynamic port VSAN membership (DPVM) application within DMS 340, e.g., a first set of instructions, while another component may contain VSAN to VLAN mappings or associations that may be queried or managed by association manager 330 or by a second set of instructions. The different sets of instructions need not run on the same processor. In other words, the DMS 340 generically encompasses all of the database functions that may be needed at a network switch, e.g., switch 120 from FIG. 1, when implementing MAC address or PWWN to VLAN mapping process logic 400. The database may be a distributed database that is distributed throughout the network shown in FIG. 1 from a central source and updated periodically. In addition, the database may be updated internally and the updates are distributed throughout the network shown in FIG. 1 to one or more other network devices by the switch or sent to the central source for redistribution.

Each of the components 310-340, may be a software application or thread running on a processor, e.g., processor 210 (FIG. 2) or they may be separate entities that communicate over a common bus, backplane, or network interfaces.

The FCoE manager 310 handles the overall connection set-up for the FCoE device, e.g., FCoE host 140. In this regard, the VLAN mapping process logic 400 is part of or associated with the FCoE manager 310 as shown by the dotted line in FIG. 3. For example, the FCoE Manager 310 handles the creation of the VFC interfaces for each physical port. The FCoE device initiates VLAN discovery, as described above, to the FCoE manager 310 over the FCoE device's native VLAN and obtains the corresponding VLAN configured to be used for further communication. During VLAN discovery, the FCoE manager 310 sends a VSAN query to the DMS 340 using the FCoE device's hardware MAC address or/and PWWN. The DMS 340 database has a MAC or PWWN based VSAN configuration for the respective FCoE device. The DMS 340 returns the corresponding VLAN information to the FCoE manager 310 based on the MAC address or PWWN based search. The FCoE manager 310 sends the corresponding VLAN information to the FCoE device over the FCoE device's native VLAN.

When the FCoE manager has the corresponding VLAN information, the FCoE device can now attempt to login to the SAN/switch fabric. The Fport server 320 handles fabric login and manages the login session for each host based on their assigned FC identification, VSAN, and hardware MAC address. During fabric login, the Fport server 320 queries the DMS 340 to validate the VSAN. The DMS 340 keeps track of the FCoE device login/logout notifications from Fport server 320. The Fport server 320 also provides port status to the FCoE Manager 310 during creation of the VFC interface as shown. The FCoE Manager 310 may also query the Fport server 320 or the DMS 340 for port information, e.g., when a login request is received from a host the DMS 340 may be queried for port status prior to responding to the login request.

The DMS 340 maintains the configuration and other attributes for the various members, e.g., host 140, of the SAN fabric. Some example attributes include address type, e.g., PWWN, Node World Wide Name (NWWN), or hardware MAC address, VSAN ID, device flags, port status, device aliases, and the like. The DMS 340 maintains the various mappings for devices that have access to the SAN fabric, e.g., the VLAN to VSAN mappings used by hardware MAC address or PWWN to VLAN mapping process logic 400. For ease of illustration, the description of other functions performed at the switch 140 and FCoE devices, e.g., FCF discovery, have been omitted from this description.

Figure 4:
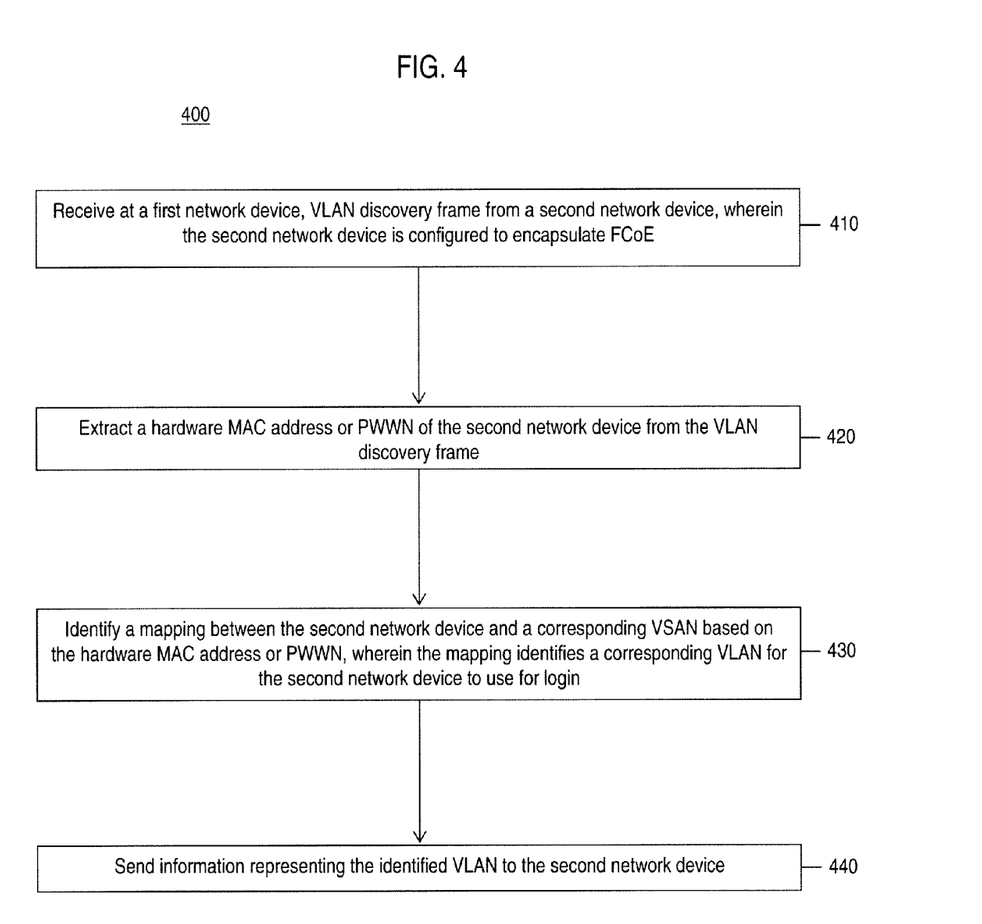
FIG. 4 is an example of a flowchart generally depicting a process for determining a VLAN to VSAN mapping using a hardware MAC address.

Referring to FIG. 4, an example flowchart is shown that generally depicts the operations of the process logic 400 for determining a VLAN to VSAN mapping using a hardware MAC address. At 410, at a first network device (e.g., network switch 120), a VLAN discovery frame is received from a second network device (e.g., host FCoE network device 140). The second network device is configured to encapsulate FCoE. At 420, the hardware MAC address or PWWN of the second network device is extracted from the VLAN discovery frame. At 430, a mapping is identified between the second network device and a corresponding VSAN based on the hardware MAC address or PWWN. The mapping identifies a corresponding VLAN for the second network device to use for VLAN login in order to communicate with the appropriate VSAN. At 440, information representing the identified VLAN is sent to the second network device.

Figure 5A:
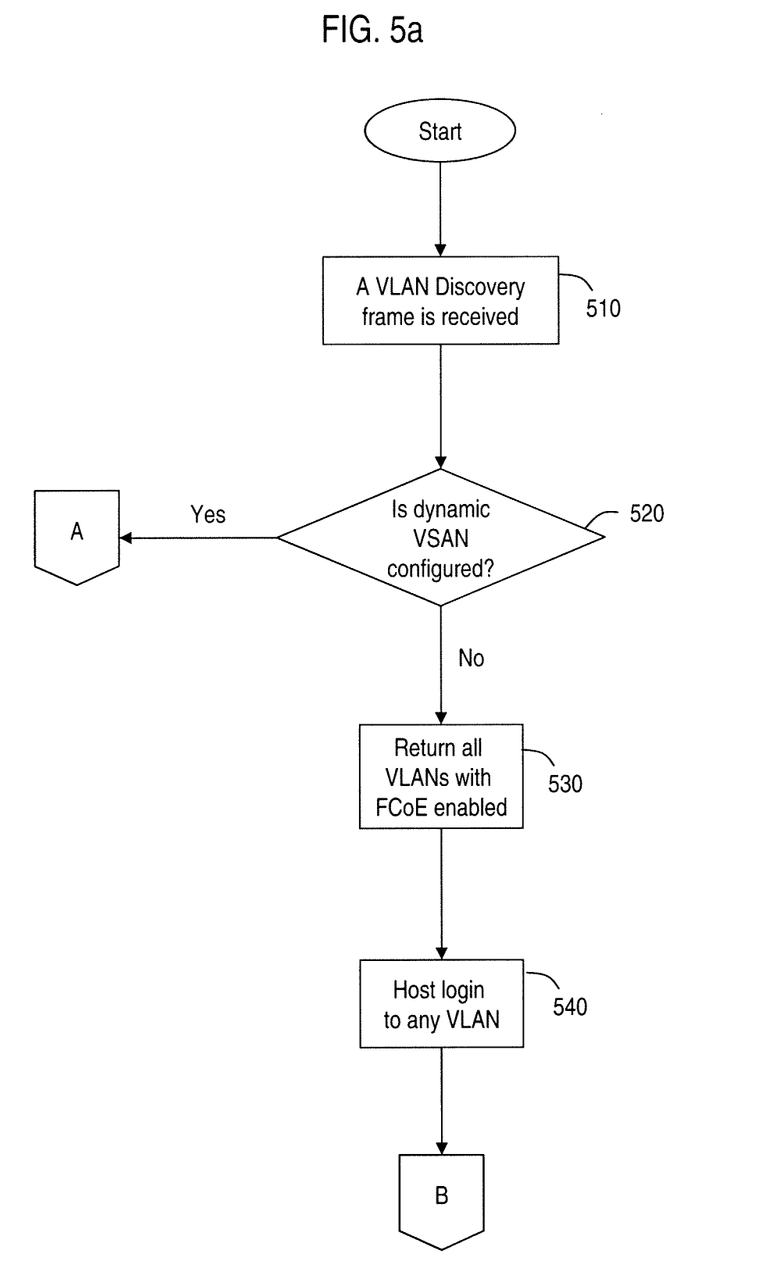
FIGS. 5a and 5b show an example of a flowchart depicting an example of a process for determining a VLAN to VSAN mapping using a hardware MAC address.
Figure 5B:
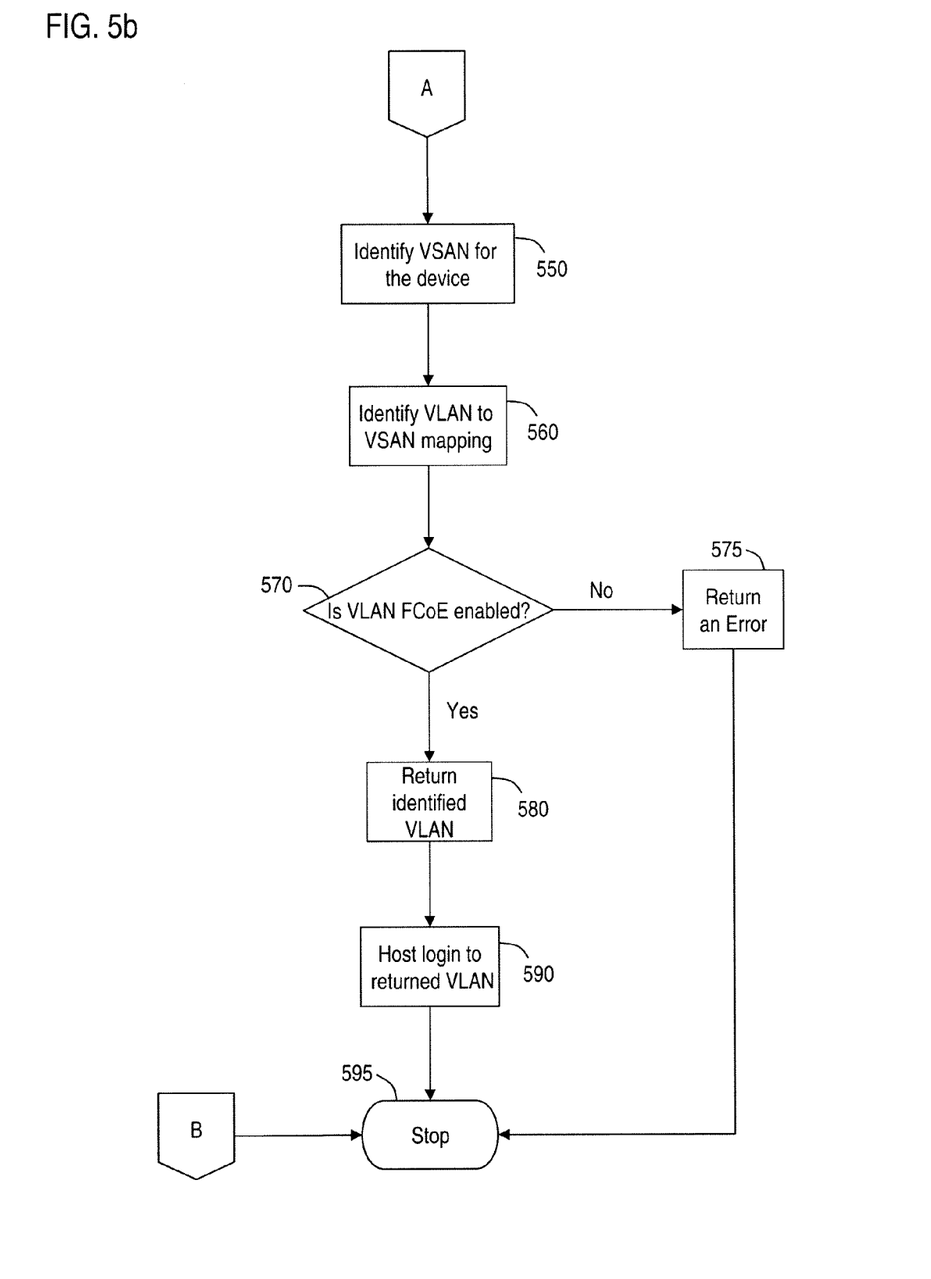

Turning to FIGS. 5a and 5b, a flowchart is shown that depicts a more detailed example process to determine a VLAN to VSAN mapping using a hardware MAC address or PWWN, and to facilitate VLAN login. At 510, a VLAN discovery frame is received. The VLAN discovery frame operates as described previously. At 520, a check is made to see if dynamic port VSAN membership (DVPM) is enabled, e.g., the DMS 340 database is queried to see if DVPM is enable. When DVPM is enabled for a host device, the assigned VSAN stays with the host regardless of host location, i.e., if the host moves to a different part of the network the VSAN does not need to be reconfigured. If DVPM is not enabled the switch is not allowed to dynamically identify the VLAN to VSAN mapping using the hardware MAC address, and at 530, all VLAN IDs for VLANs with FCoE enabled are returned to the host. At 540, the host can login to any of the returned VLANs and the process continues at B in FIG. 5b.

If DVPM is enabled, the process continues at A in FIG. 5b. At 550, the associated VSAN for the device is identified based on the hardware MAC address or PWWN of the host device. At 560, the VLAN to VSAN mapping is identified based on the hardware MAC address or PWWN. At 570, it is determined if the identified VLAN is FCoE enabled. If the VLAN is not FCoE enabled, then the host will not be allowed to login. VLAN discovery will fail and the process returns to 575, where an error is returned, or other information is returned that may be useful for resolving connection issues. If the VLAN is FCoE enabled, at 580, the identified VLAN information is returned to the host. At 590, the host can login to any of the returned VLANs. The process continues to B, and at 595 the process is complete.

Techniques are provided herein for receiving at a first network device, a VLAN discovery frame from a second network device. The second network device is configured to encapsulate FCoE. The hardware MAC address or PWWN of the second network device is extracted from the VLAN discovery frame. A mapping is identified between the second network device and a corresponding VSAN based on the hardware MAC address or PWWN. The mapping identifies a corresponding VLAN for the second network device to use for login, and information representing the identified VLAN is sent to the second network device. The VLAN to VSAN mappings may be contained in databases or tables that are relationally linked, e.g., the database may contain MAC address or PWWN to VSAN mappings linked to VLAN to VSAN mappings to obtain the overall VLAN to VSAN mappings.

The above description is intended by way of example only.

What is claimed is:

1. A method comprising:
   receiving at a first network device, traffic including a virtual local area network (VLAN) discovery frame from a second network device and forwarding traffic between the second network device and a virtual storage area network (VSAN), wherein the second network device is configured to encapsulate Fiber Channel over Ethernet (FCoE) traffic;
   extracting a hardware media access control (MAC) address or Port World Wide Name (PWWN) of the second network device from the VLAN discovery frame;
   identifying a mapping between the second network device and a corresponding VSAN based on the hardware MAC address or PWWN, wherein the mapping identifies a corresponding VLAN for the second network device to use for login in order to communicate with the corresponding VSAN; and
   sending information representing the identified VLAN to the second network device.

2. The method of claim 1, further comprising querying a database for the VLAN to VSAN mapping based on the MAC address or PWWN.

3. The method of claim 2, wherein the database contains MAC address or PWWN to VSAN mappings and VLAN to VSAN mappings.

4. The method of claim 3, further comprising updating the database internally or by receiving updates to the database.

5. The method of claim 4, further comprising distributing internal updates to the database to another network device.

6. The method of claim 2, wherein the database is a distributed database that may be common to any device in the network that is configured to identify VLAN to VSAN mappings.

7. The method of claim 2, further comprising storing status information for ports served by the first network device in the database, wherein the status information is managed by a port server.

8. The method of claim 2, wherein querying comprises querying the database for the MAC address or PWWN to VSAN mappings using a first application and querying the database for the VLAN to VSAN mappings using a second application.

9. An apparatus comprising:
   a network interface configured to:
      communicate with a network device over a network;
      receive traffic including a virtual local area network (VLAN) discovery frame from the network device and forward traffic between the network device and a virtual storage area network (VSAN), wherein the network device is configured to encapsulate Fiber Channel over Ethernet (FCoE) traffic;
   a processor configured to:
      extract a hardware media access control (MAC) address or Port World Wide Name (PWWN) of the network device from the VLAN discovery frame;
      identify a mapping between the network device and a corresponding VSAN based on the hardware MAC address or PWWN, wherein the mapping identifies a corresponding VLAN for the network device to use for login in order to communicate with the corresponding VSAN; and send information representing the identified VLAN to the network device.

10. The apparatus of claim 9, wherein the processor is further configured to query a database for the VLAN to VSAN mapping based on the MAC address or PWWN, wherein the database contains MAC address or PWWN to VSAN mappings and VLAN to VSAN mappings.

11. The apparatus of claim 10, wherein the processor is further configured to update the database internally and receive updates to the database over the network.

12. The apparatus of claim 11, wherein the processor is further configured to distribute internal updates to the database to another network device.

13. The apparatus of claim 10, further comprising a plurality of ports, wherein the processor is further configured to store and manage status information associated with the plurality of ports in the database.

14. The apparatus of claim 10, wherein the processor is further configured to query the database for the MAC address or PWWN to VSAN mappings using a first software application and to query the database for the VLAN to VSAN mappings using a second software application.

15. A non-transitory computer readable medium storing instructions that, when executed by a processor, cause the processor to:
  receive traffic including a virtual local area network (VLAN) discovery frame from a network device and forward traffic between the network device and a virtual storage area network (VSAN), wherein the network device is configured to encapsulate Fiber Channel over Ethernet (FCoE) traffic;
  extract a hardware media access control (MAC) address or Port World Wide Name (PWWN) of the network device from the VLAN discovery frame;
  identify a mapping between the network device and a corresponding VSAN based on the hardware MAC address or PWWN, wherein the mapping identifies a corresponding VLAN for the network device to use for login in order to communicate with the corresponding VSAN; and
  send information representing the identified VLAN to the network device.

16. The non-transitory computer readable medium of claim 15, further comprising instructions that, when executed by the processor, cause the processor to query a database for the VLAN to VSAN mapping based on the MAC address or PWWN, wherein the database contains MAC address or PWWN to VSAN mappings and VLAN to VSAN mappings.

17. The non-transitory computer readable medium of claim 16, further comprising instructions that, when executed by the processor, cause the processor to update the database internally and receive updates to the database via the network device.

18. The non-transitory computer readable medium of claim 17, further comprising instructions that, when executed by the processor, cause the processor to transmit internal updates to the database to another network device.

19. The non-transitory computer readable medium of claim 16, further comprising instructions that, when executed by the processor, cause the processor to store status information associated with the plurality of ports in the database.

20. The non-transitory computer readable medium of claim 16, further comprising instructions that, when executed by the processor, cause the processor to query the database for the MAC address or PWWN to VSAN mappings using a first set of instructions and to query the database for the VLAN to VSAN mappings using a second set of instructions.

* * * * *